C. Seymour.
Upsetting Tires.
N° 36,372.  Patented Sept. 2, 1862.
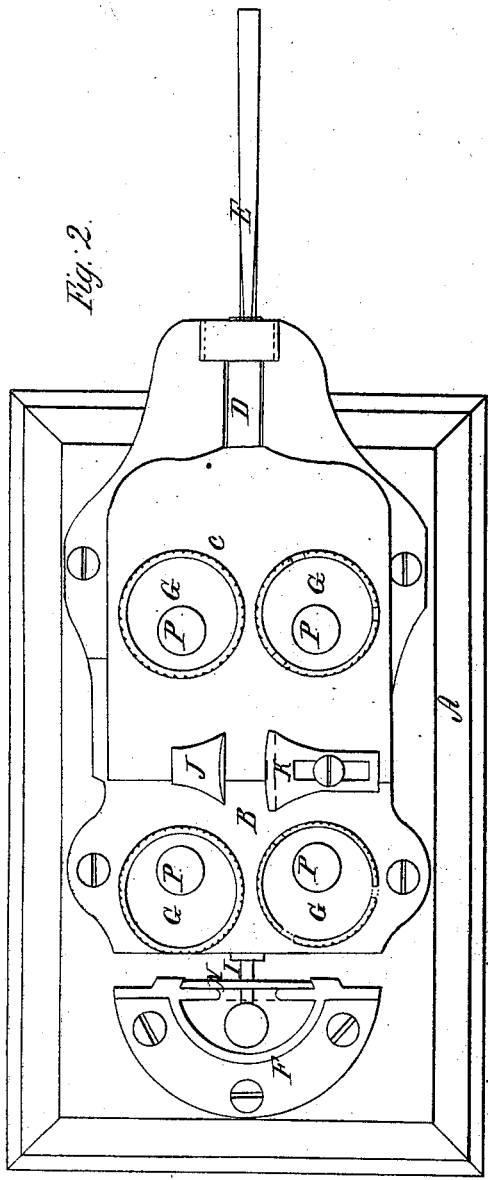
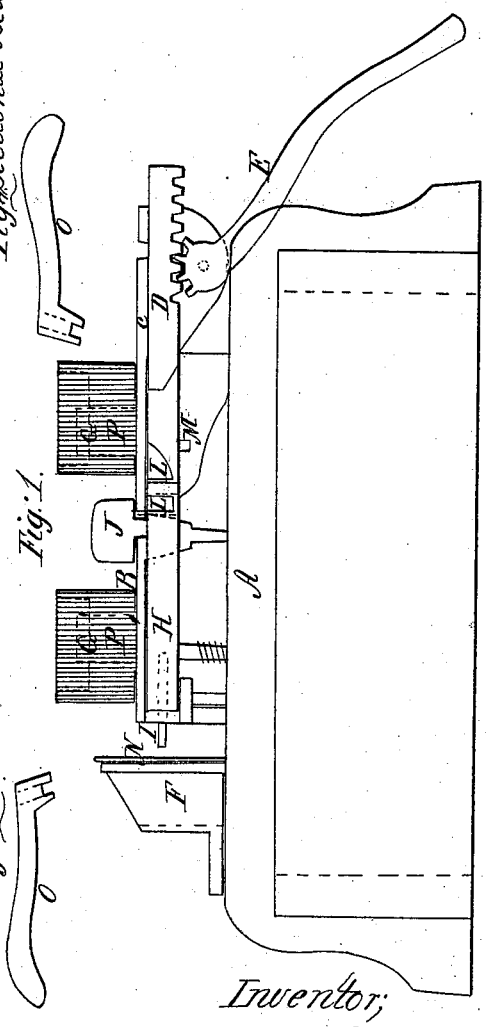
Witnesses;
John Mühlken
B. Holmes
Inventor;
Charles Seymour

UNITED STATES PATENT OFFICE.

CHARLES SEYMOUR, OF LA PORTE, INDIANA.

IMPROVEMENT IN MACHINES FOR UPSETTING AND STRETCHING TIRES.

Specification forming part of Letters Patent No. 36,372, dated September 2, 1862.

*To all whom it may concern:*

Be it known that I, CHARLES SEYMOUR, of La Porte, State of Indiana, have made new and useful Improvements in Machines for Stretching, Staving, and Punching Tires; and I do hereby declare that the following is a full and exact description thereof, reference being had to the accompanying drawings, and to the letters of reference marked thereon—

Figure 1 being a longitudinal sectional view, Fig. 2 being a top view, Figs. 3 and 4 sections of levers.

To enable others skilled in the art to make and use my invention, I will proceed to describe its construction and operation.

In constructing my improved tire stretching, staving, and punching machine, I have a strong substantial frame, B, made of cast-iron, supported upon columns or legs of convenient height, with the necessary slots, mortises, &c., cast in it. There is an offset near the front end of the frame B, which receives the sliding bed C, thus making the top of the machine level. The bed C has T-shaped projections on its under side, which drop through T-shaped slots in frame B. Said projections serve as guides to keep the bed C in place. The adjustable jaw K, being secured in place, prevents the bed C from rising. The rack D, projecting from the rear end of bed C, as shown in Fig. 1, works in the cogs on the sector E, which is secured in place and works on a pin passing through strong jaws formed on the frame B. Thus it will be seen that by moving the arm of the sector up and down the bed C is made to slide back and forth at the will of the operator.

On the posts P P P P, on frame B and sliding bed C, is placed the eccentric-wheels G G G G which have liberty to work freely. Midway between the front and rear eccentrics is placed a stationary jaw, J, opposite to which is a sliding or adjustable jaw, K. Underneath and in the center of frame B is placed the punch-stock H, which slides freely through mortises, as shown in Fig. 1. Through the rear end of the punch-stock H a slot is made, into which a projection formed on the under side of the sliding bed fits, thus connecting the punch-stock with the bed. Into the front end of the punch-stock the punch I is inserted. The die-stand F, which is of a semicircular form at its base, supports the die N.

When the circle of a tire is to be enlarged, it is heated at the point to be stretched, and laid on its edge between the eccentric-wheels G G G G, they being placed in the position as shown in Fig. 2. The workmen then take the levers *o o*, which fit into notches formed in the upper rims of the eccentrics, put them in place, and turn the two eccentrics up against the tire. The sector-arm then being borne down tightens the grip of the eccentrics, thereby holding the tire very firmly thus by continuing the pressure upon the arm of the sector, the sliding bed moving back along the tire to be stretched to any desired degree, and with the greatest degree of certainty. Again, when the circle of a tire has become too large for the wheel, to save the trouble of cutting and welding it is only necessary to heat the tire in the smith's fire and place it in the machine in the position before described, the eccentrics being reversed in these positions and the sector-arm being in its lowest position, the adjustable jaw K being set up so close to the tire as to leave room only for the enlargement caused by staving. The sector-arm then being forced up the eccentrics hold the tire at the two points, and the force being exerted upon the heated portion of the iron it is staved up until the diameter of the circle is made to suit the wheel. It will be readily seen that the stretching or staving up of a tire is in this way accomplished and with the highest degree of certainty in very little more time than is required to heat a small portion of it in the smith's fire. The operation of punching is performed by heating the bars at the points where the holes are to be punched and placing it against the die. The sector-arm being then raised drives the punch with great force through the bar, thus facilitating the operation of punching very much, besides leaving the face of the tire smooth and even to fit the rim of the wheel.

What I claim as my invention, and desire to secure by Letters Patent, is—

1. The frame B, sliding bed-plate C, with its rack D, sector E, the stationary jaw J and adjustable jaw K, when arranged to operate in combination with the eccentrics G G G G, the said parts operating together in the manner and for the purpose set forth.

2. In combination with frame B, sliding bedplate C, rack D, and sector E, the punchstock H, punch I, die-stand F, and die N, when the several parts are arranged in the manner and for the purpose specified.

The above specification of my new and useful improvements in tire stretching, upsetting, and punching machines signed and witnessed this 10th day of February, A. D. 1862.

CHARLES SEYMOUR.

Witnesses:
JOHN MILLIKAN,
R. HOLMES.